(12) United States Patent
Patney et al.

(10) Patent No.: US 9,747,718 B2
(45) Date of Patent: Aug. 29, 2017

(54) SYSTEM, METHOD, AND COMPUTER PROGRAM PRODUCT FOR PERFORMING OBJECT-SPACE SHADING

(71) Applicant: NVIDIA Corporation, Santa Clara, CA (US)

(72) Inventors: Anjul Patney, Kirkland, WA (US); Eric B. Enderton, Berkeley, CA (US); Eric B. Lum, San Jose, CA (US); Marco Salvi, Kirkland, WA (US); Christopher Ryan Wyman, Redmond, WA (US); Yubo Zhang, Santa Clara, CA (US); Yong He, Pittsburgh, PA (US); G. Evan Hart, Jr., Bristow, VA (US); Kayvon Fatahalian, Pittsburgh, PA (US); Yury Uralsky, Santa Clara, CA (US); Henry Packard Moreton, Woodside, CA (US); Aaron Eliot Lefohn, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 37 days.

(21) Appl. No.: 14/645,340

(22) Filed: Mar. 11, 2015

(65) Prior Publication Data

US 2016/0049000 A1  Feb. 18, 2016

Related U.S. Application Data

(60) Provisional application No. 62/036,552, filed on Aug. 12, 2014.

(51) Int. Cl.
*G06T 15/50* (2011.01)
*G06T 15/80* (2011.01)
(Continued)

(52) U.S. Cl.
CPC ............. *G06T 15/80* (2013.01); *G06T 1/20* (2013.01); *G06T 15/005* (2013.01); *G06T 17/205* (2013.01); *G06T 2210/36* (2013.01)

(58) Field of Classification Search
CPC ....... G06T 15/04; G06T 15/80; G06T 15/005; G06T 1/20; G06T 17/205; G06T 2210/36
(Continued)

(56) References Cited

U.S. PATENT DOCUMENTS

| 6,940,505 B1* | 9/2005 | Savine ............... G06T 17/20 345/419 |
| 2004/0174376 A1* | 9/2004 | Deering ............... G06T 15/503 345/592 |

(Continued)

OTHER PUBLICATIONS

U.S. Appl. No. 14/645,327, filed Mar. 11, 2015.
(Continued)

*Primary Examiner* — Xiao Wu
*Assistant Examiner* — Sarah Lhymn
(74) *Attorney, Agent, or Firm* — Zilka-Kotab, PC

(57) ABSTRACT

A system, method, and computer program product are provided for performing object-space shading. A primitive defined by vertices in three-dimensional (3D) space that is specific to an object defined by at least the primitive is received and a shading sample rate is computed for the primitive based on a screen-space derivative of coordinates of a pixel fragment transformed into the 3D space. A shader program is executed by a processing pipeline to compute shaded attributes for the primitive according to the computed shading sample rate.

20 Claims, 11 Drawing Sheets

(51) Int. Cl.
*G06T 1/20* (2006.01)
*G06T 15/00* (2011.01)
*G06T 17/20* (2006.01)

(58) Field of Classification Search
USPC ....... 345/418, 419, 420, 421, 422, 423, 426, 345/427, 501, 581, 582, 583, 584, 587, 345/589, 619
See application file for complete search history.

(56) References Cited

U.S. PATENT DOCUMENTS

| 2014/0139512 | A1* | 5/2014 | Piazza | G06T 15/40 345/419 |
| 2015/0070355 | A1* | 3/2015 | Clarberg | G06T 15/005 345/426 |
| 2015/0170345 | A1* | 6/2015 | Vaidyanathan | G06T 15/503 345/599 |
| 2016/0048999 | A1 | 2/2016 | Patney et al. | |

OTHER PUBLICATIONS

Burns, C. A. et al., "A Lazy Object-Space Shading Architecture With Decoupled Sampling," High-Performance Graphics, 2010, pp. 1-10.

Hill, S. and Baker, D., "Rock-Solid Shading," SIGGRAPH 2012, pp. 1-96.

Liktor, G. et al., "Decoupled Deferred Shading for Hardware Rasterization," ACM, 2012, pp. 1-8.

Clarberg, P. et al., "A Sort-based Deferred Shading Architecture for Decoupled Sampling," ACM Transactions on Graphics, vol. 32, No. 4, Article 141, Jul. 2013, pp. 141:1-141:10.

Ragan-Kelley, J., "Decoupled Sampling for Graphics Pipelines," ACM Transactions on Graphics 30(3), 2011, pp. 1-17.

Clarberg, P. et al., "AMFS: Adaptive Multi-Frequency Shading for Future Graphics Processors," 2014, pp. 1-12.

Vaidyanathan, K. et al., "Coarse Pixel Shading," High-Performance Graphics, 2014, pp. 1-10.

Andersson, M. et al., "Adaptive Texture Space Shading for Stochastic Rendering," Eurographics, 2014, pp. 1-10.

He, Y. et al., "Extending the Graphics Pipeline with Adaptive, Multi-Rate Shading," ACM Transactions on Graphics, vol. 33, No. 4, 2014, pp. 1-12.

Triangle textures, Sep. 2013, retrieved from http://ptex.us/tritex.html.

Yuksel, C. et al., "Mesh Colors," ACM Transactions on Graphics, vol. 29, No. 2, Article 15, Apr. 2010, pp. 1-11.

Non-Final Ofice Action from U.S. Appl. No. 14/645,327, dated Jun. 30, 2016.

Huttner, T., "High Resolution Textures," Visualization '98—Late Breaking Hot Topics Papers, 1998, pp. 1-4.

* cited by examiner

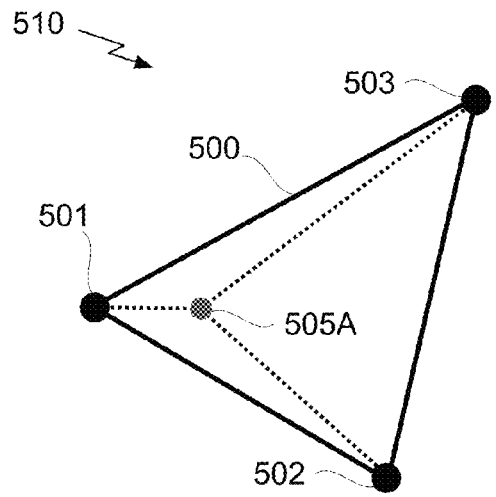
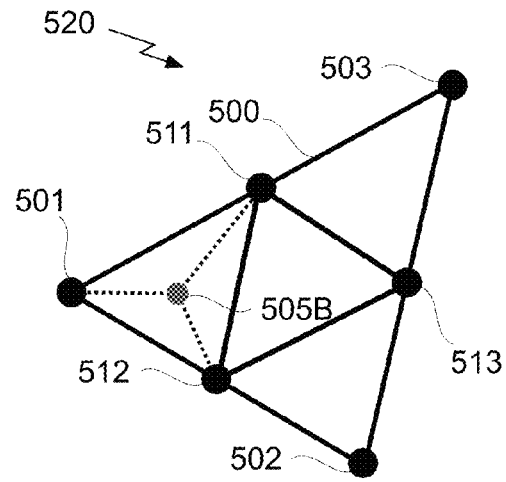
Fig. 5A                    Fig. 5B
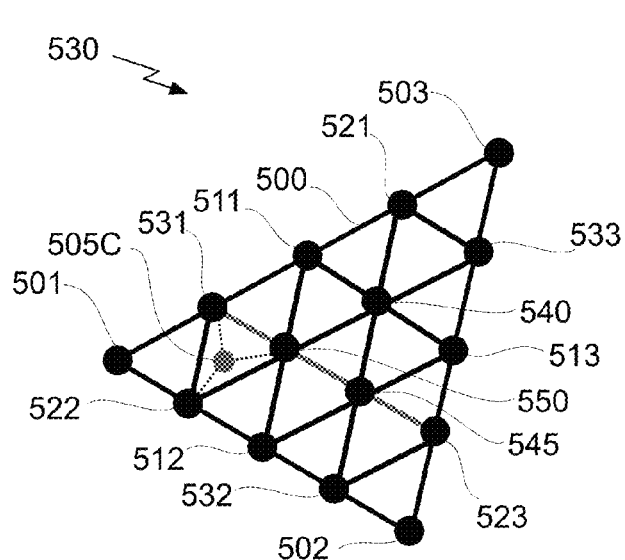
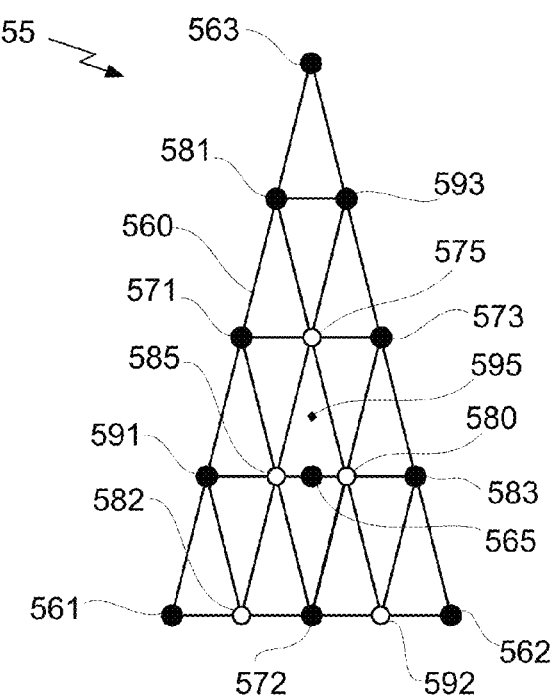
Fig. 5C                    Fig. 5D

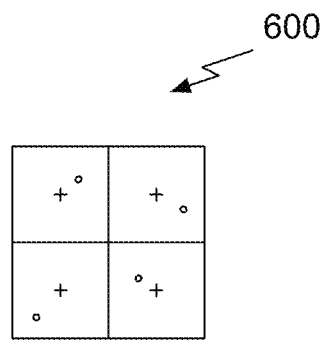
*Fig. 6A*
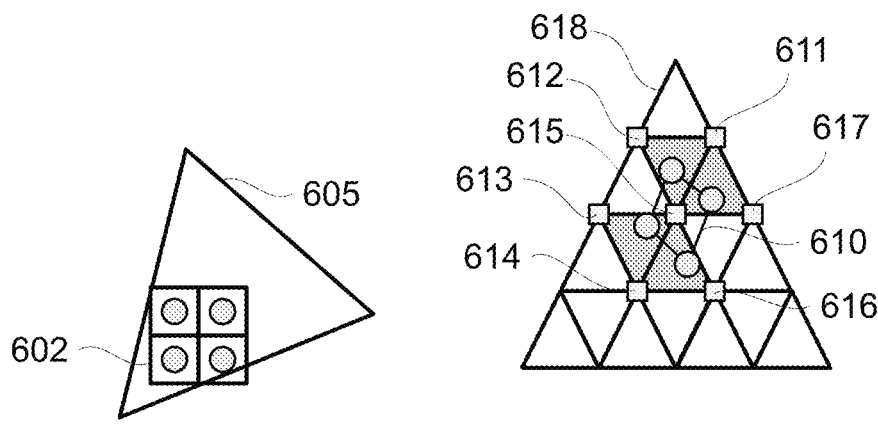
*Fig. 6B*          *Fig. 6C*
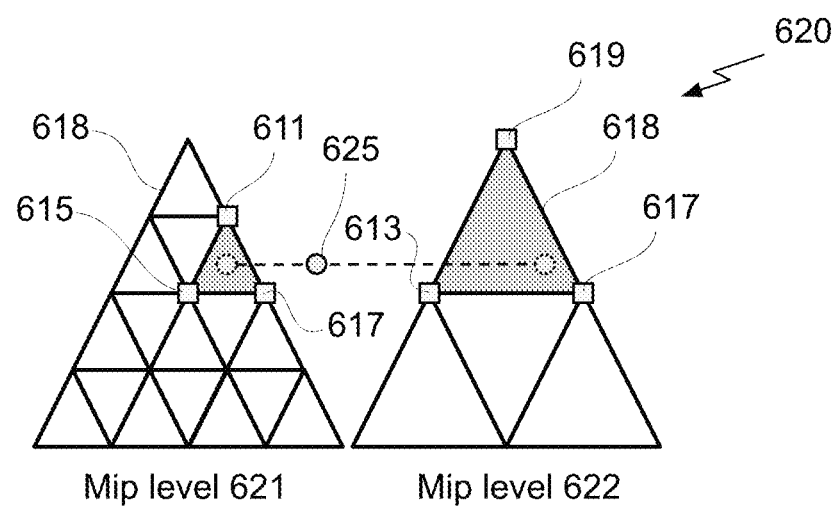
*Fig. 6D*

US 9,747,718 B2

SYSTEM, METHOD, AND COMPUTER PROGRAM PRODUCT FOR PERFORMING OBJECT-SPACE SHADING

CLAIM OF PRIORITY

This application claims the benefit of U.S. Provisional Application No. 62/036,552, titled "Variable-Rate Object-Space Shading With Trilinear Filtering," and filed Aug. 12, 2014, the entire contents of which is incorporated herein by reference.

FIELD OF THE INVENTION

The present invention relates to graphics processing, and more particularly to shading using a dynamic object-space grid.

BACKGROUND

As the resolution of display devices increases more pixels need to be shaded for each frame. To maintain a high frame rate for high resolution displays, techniques have been developed to avoid unnecessary shading operations. Examples of shading techniques include low-rate screen-space shading, upscaling low-resolution images, and multi-rate screen-space shading.

Low-rate screen-space shading suffers from temporal instability because shading samples are aligned to the screen and not to the object. At low-rates, shading terms may be undersampled and the shaded pixels tend to shimmer and swim or flicker as the camera or object moves. The shimmering and flickering artifacts are especially noticeable on surfaces with specular illumination and high-frequency normal maps. Additionally, evaluating shading terms at rates lower than once per pixel often results in shading at samples lying outside the parent primitive, which may cause visual artifacts in scenes with fine geometric detail.

Upscaling low-resolution images suffers from the problem of having to couple the shading rate with the visibility rate. In other words, the rate at which visibility testing is performed equals the rate at which shading is performed. As a result, lowering the shading rate may also lower the perceived geometric detail in a scene, which is often undesirable.

Multi-rate screen-space shading is a technique that reduces the shading workload by lowering rates for low-frequency parts of the scene. Therefore, the shading rate is scene dependent and not uniform. Multi-rate screen-space shading may not provide a consistently high-performance frame rate. Thus, there is a need for addressing this issue and/or other issues associated with the prior art.

SUMMARY

A system, method, and computer program product are provided for performing object-space shading. The method includes the steps of receiving a primitive defined by vertices in 3D space that is specific to an object defined by at least the primitive and computing a shading sample rate for the primitive based on a screen-space derivative of coordinates of a pixel fragment transformed into the 3D space. A shader program is then executed by a processing pipeline to compute shaded attributes for the primitive according to the computed shading sample rate.

BRIEF DESCRIPTION OF THE DRAWINGS

FIGS. 5A through 5C illustrate an object-space mipmapped shading grid that is defined for a primitive, in accordance with another embodiment;

FIG. 5D illustrates an object-space shading grid that is defined for a narrow primitive, in accordance with another embodiment;

FIG. 6A illustrates sample pattern for a pixel, in accordance with one embodiment;

FIG. 6B illustrates a fragment in screen-space, in accordance with one embodiment;

FIG. 6C illustrates a footprint of the fragment in object-space, in accordance with one embodiment;

FIG. 6D illustrates two nearest mip levels of an object-space grid that are used to generate a shaded sample, in accordance with one embodiment;

DETAILED DESCRIPTION

Shading using a dynamic object-space grid allows a scene to be shaded at varying rates for each object, with a graceful impact to image quality. An object-space shading system provides improved image quality at per-pixel shading rates, and relatively low reduction in quality at lower shading rates. Because the shading is performed in object-space, object shimmering effects are significantly reduced. Additionally, the visibility rate may be decoupled from the shading rate, so that full-rate visibility (i.e., z-testing per sample) may be performed with variable rate shading.

Figure 1A:
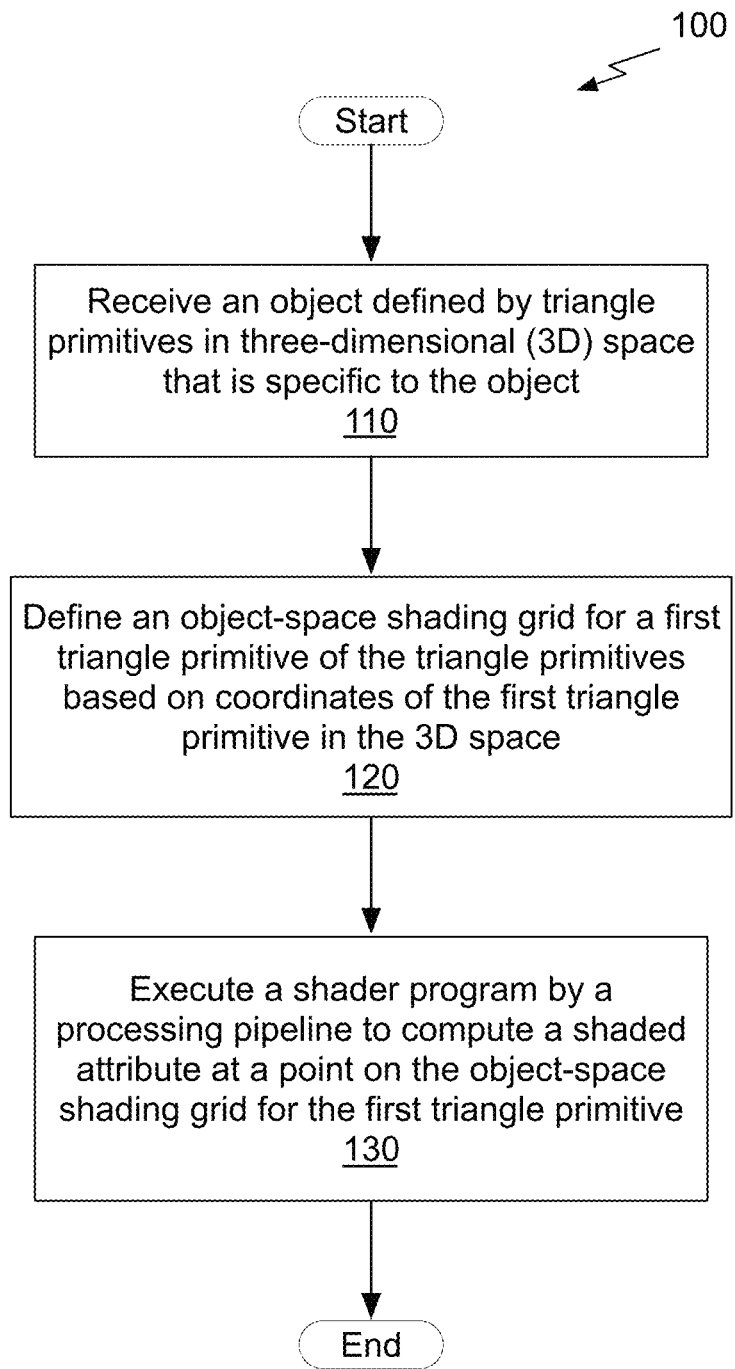
FIG. 1A illustrates a flowchart of a method for shading using a dynamic object-space grid, in accordance with one embodiment.

FIG. 1A illustrates a flowchart of a method 100 for shading using a dynamic object-space grid, in accordance with one embodiment. At step 110, an object is received. The object is defined by triangle primitives in three-dimensional (3D) space that is specific to the object. In the context of the present description, the local coordinate system enclosed within each triangle primitive may be defined by barycentric coordinates. In the context of the present description, the 3D space that is specific to the object is a temporally-coherent object-space, where the object is defined by one or more triangle primitives. World-space includes all of the objects in a scene and therefore is capable of illustrating relative positions of the different objects in the scene. In contrast with object-space, camera-space is a view of the objects in the scene as seen from the camera. In other words, camera-space is specific to the camera. Finally, screen-space is a two-dimensional space that is a projection of the scene onto a two-dimensional plane in camera-space.

At step 120, an object-space shading grid is defined for a first triangle primitive of the triangle primitives based on coordinates of the first triangle primitive in the 3D space. In the context of the present description, barycentric coordinates define the local coordinate system enclosed within the triangle primitives and the barycentric coordinates also define points of the shading grid, so that the shading grid is a triangular shading grid. Barycentric shading grids may apply to legacy content in real-time rendering, and do not require special scene parameterization, object parameterization, and/or primitive parameterization. Therefore, legacy content may be shaded using a barycentric shading grid. In one embodiment, an object-space shading grid is defined for individual primitives and the object-space shading grid for a particular primitive is specific to the primitive.

In one embodiment, the object-space shading grid is mipmapped and one or more levels of the mipmapped object-space shading grid are "sampled" according to a shading rate. However, unlike traditional mipmaps, shaded samples for the higher mip levels (i.e., lower resolution mip levels) are not generated by filtering shaded samples for the lower mip levels (i.e., higher resolution mip levels). Instead, shaded samples for each mip level may be computed dynamically for any particular point at any mip level of the object-space shading grid.

At step 130, a shader program is then executed by a processing pipeline to compute a shaded attribute at a point on the object-space shading grid for the first triangle primitive. Execution of the shader program at a point on the object-space shading grid corresponds to "sampling" the object-space shading grid and produces a shaded attribute. A single point may be sampled or multiple points may be sampled and filtered to produce the shaded attribute. A shaded sample comprises one or more shaded attributes.

In the context of the present description, the processing pipeline may be a graphics processing pipeline that is implemented by a graphics processor or a general purpose processor, either of which is configured to execute instructions of the shader program. In the context of the present description, a shaded attribute may be one or more of color, depth, texture coordinates, and the like. A surface equation corresponding to a graphics primitive such as a triangle may be evaluated at a sample location (i.e., point) on the object-space shading grid to generate an attribute value.

In one embodiment, shading requests are generated in object-space after visibility calculations have been performed. Each screen-space shading location for an object generates one or more shading requests that sample corresponding points of the object-space shading grid. The object-space shading grid is not necessarily recomputed for each frame, even when the camera position changes. Because the shading grid is defined in object-space, the shading grid need only be recomputed when the shape of the object changes in object-space. Additionally, because the shading calculations are performed using shading grids that are each aligned to primitives, the samples always lie within the respective primitive. Consequently, temporally stable images may be produced and shader aliasing artifacts like specular aliasing may be significantly reduced. When the camera position changes, the points on the shading grid that are sampled for a particular screen-space pixel vary based on the camera position relative to the object. In one embodiment, a screen-space pixel footprint is transformed into object-space to identify the points on the object-space shading grid that are sampled.

Figure 1B:
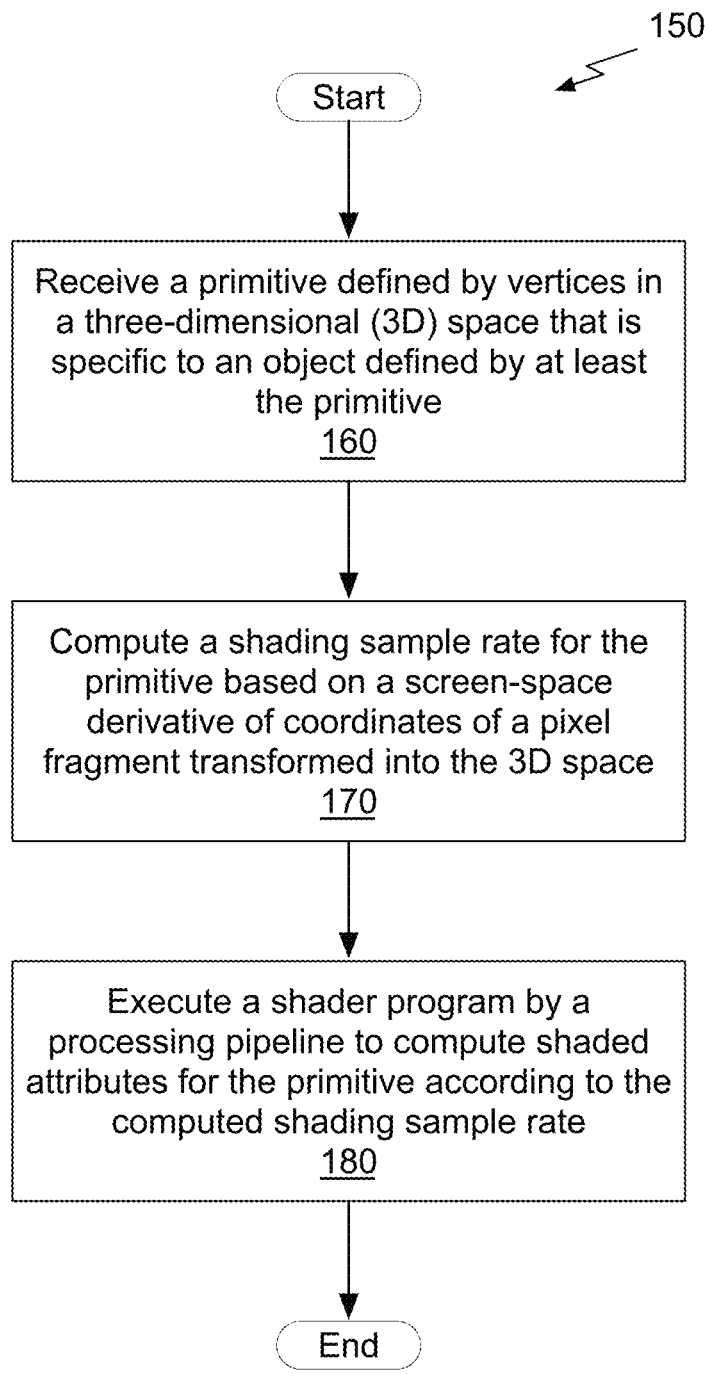
FIG. 1B illustrates a flowchart of a method for performing object-space shading, in accordance with one embodiment.

FIG. 1B illustrates a flowchart of a method 150 for performing object-space shading, in accordance with one embodiment. At step 160, an object is received. The object is defined by vertices of one or more primitives in a 3D space that is specific to the object. In the context of the present description, the 3D space that is specific to the object is a temporally-coherent object-space. In one embodiment, the object is defined by one or more triangle primitives.

At step 170, a shading sample rate is computed for the primitive based on a screen-space derivative of coordinates of a pixel fragment in the 3D space that is specific to the object. In the context of the present description, the screen-space derivative may be computed using object-space coordinates of a pixel footprint that is transformed from screen-space to the 3D space. In one embodiment, a derivative of the object-space coordinates approximating the pixel footprint is computed to determine the shading sample rate. In one example, the pixel footprint may approach the size of the object, encompassing several primitives, so that the shading rate is low and the object nearly fits within the screen-space pixel. In another example, the pixel footprint may be smaller than the size of a single primitive of the object, so that the shading rate is high and the object covers several screen-space pixels.

At step 180, a shader program is then executed by a processing pipeline to compute shaded attributes for the primitive according to the shading sample rate. In the context of the present description, execution of the shader program at a point on the object-space shading grid corresponds to "sampling" the object-space shading grid and producing shaded attributes. A single point may be sampled or multiple points may be sampled and filtered to produce the shaded attribute. In one embodiment, an object-space shading grid for the object is mipmapped and one or more levels of the mipmapped object-space shading grid are "sampled" according to the shading rate.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

The Reyes rendering architecture introduced and popularized the idea of performing shading calculations in object-space. Reyes renderers use adaptive tessellation to generate shading grids before visibility calculations are performed. Generating object-space shading grids using Reyes-style adaptive tessellation is possible for real-time rendering, but it is costly to finely tessellate every primitive and inefficient to shade before performing visibility calculations. In particular, shading before visibility can be extremely inefficient in scenes with a high degree of visibility and occlusion culling. Furthermore, existing real-time 3D content, consists largely of triangular meshes that typically need to be finely tessellated for processing using a Reyes renderer. Therefore, existing real-time 3D content is not typically compatible with a Reyes renderer or existing object-space renderers.

In contrast, as described herein, shading calculations may be performed in object-space after visibility calculations are performed and without requiring tessellation of the 3D content. Furthermore, no additional parameterization of existing real-time 3D content is needed for shading using an object-space shading grid. Therefore, existing real-time 3D content is compatible with the object-space shading grid technique. A mipmapped object-space shading grid allows shading at multiple rates in a stable, decoupled fashion without temporal artifacts, and exposes opportunities to reuse shading calculations within and across primitives within an object.

In one embodiment, post-visibility screen-space shading locations are transformed into per-triangle object-space shading locations, and then quantized to a triangular mipmapped object-space shading grid of points. A shaded sample may then be computed for one or more of the points. Each screen-space location maps to a filtered combination of multiple object-space points on the object-space shading grid. A surface shader may be invoked at each one of the multiple object-space points to compute shaded samples. Shaded samples that are shared between different screen space locations (i.e., shaded samples computed at points that are shared between different object-space primitives) may be cached to reduce the number of surface shaders that are invoked. The surface shader outputs (i.e., shaded samples) may be filtered to obtain shaded attributes for pixels, such as final pixel colors.

Figure 2:
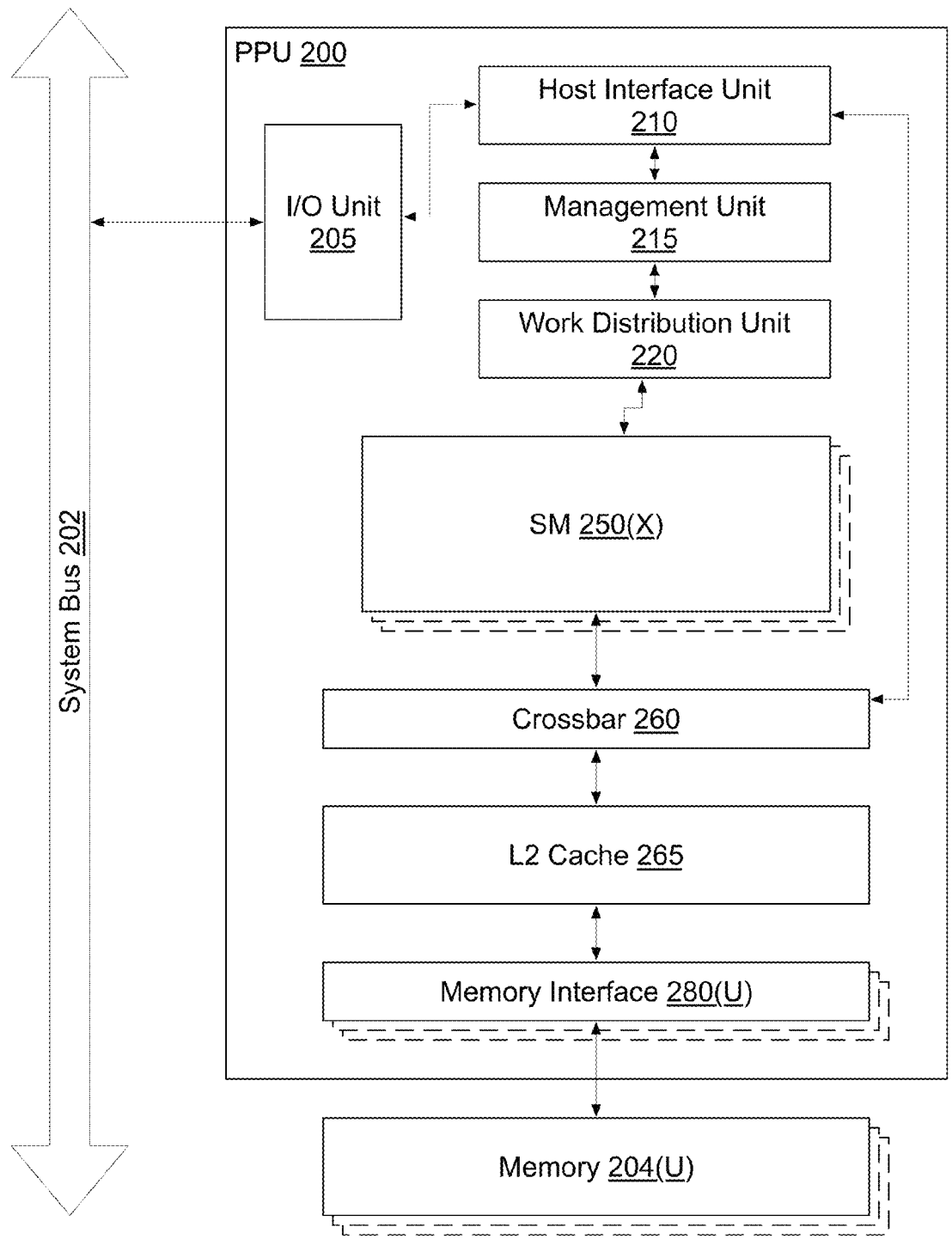
FIG. 2 illustrates a parallel processing unit (PPU), according to one embodiment.

FIG. 2 illustrates a parallel processing unit (PPU) 200, according to one embodiment. The various architecture and/or functionality of the various previous embodiments may be implemented within the PPU 200. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the grid management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the thread block array management unit (MU) 215 with pointers to one or more streams. The MU 215 selects one or more streams and is configured to organize the selected streams as a pool of pending thread block arrays. The pool of pending thread block arrays may include new thread block arrays that have not yet been selected for execution and thread block arrays that have been partially executed and have been suspended.

A work distribution unit 220 that is coupled between the MU 215 and the SMs 250 manages a pool of active thread block arrays, selecting and dispatching active thread block arrays for execution by the SMs 250. Pending thread block arrays are transferred to the active thread block array pool by the MU 215 when a pending thread block array is eligible to execute, i.e., has no unresolved data dependencies. An active thread block array is transferred to the pending pool when execution of the active thread block array is blocked by a dependency. When execution of a thread block array is completed, the thread block array is removed from the active thread block array pool by the work distribution unit 220. In addition to receiving thread block arrays from the host interface unit 210 and the work distribution unit 220, the MU 215 also receives thread block arrays that are dynamically generated by the SMs 250 during execution of a thread block array. These dynamically generated thread block arrays join the other pending thread block arrays in the pending thread block array pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more thread block arrays for execution. In one embodiment, the PPU 200 implements a SIMD (Single-Instruction, Multiple-Data) architecture where each thread block (i.e., warp) in a thread block array is concurrently executed on a different data set by different threads in the thread block. The driver kernel defines thread blocks that are comprised of k related threads, such that threads in the same thread block may exchange data through shared memory. In one embodiment, a thread block comprises 32 related threads and a thread block array is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the MU 215 may configure one or more SMs 250 to execute a vertex shader program that processes a number of vertices defined by the model data. In one embodiment, the MU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
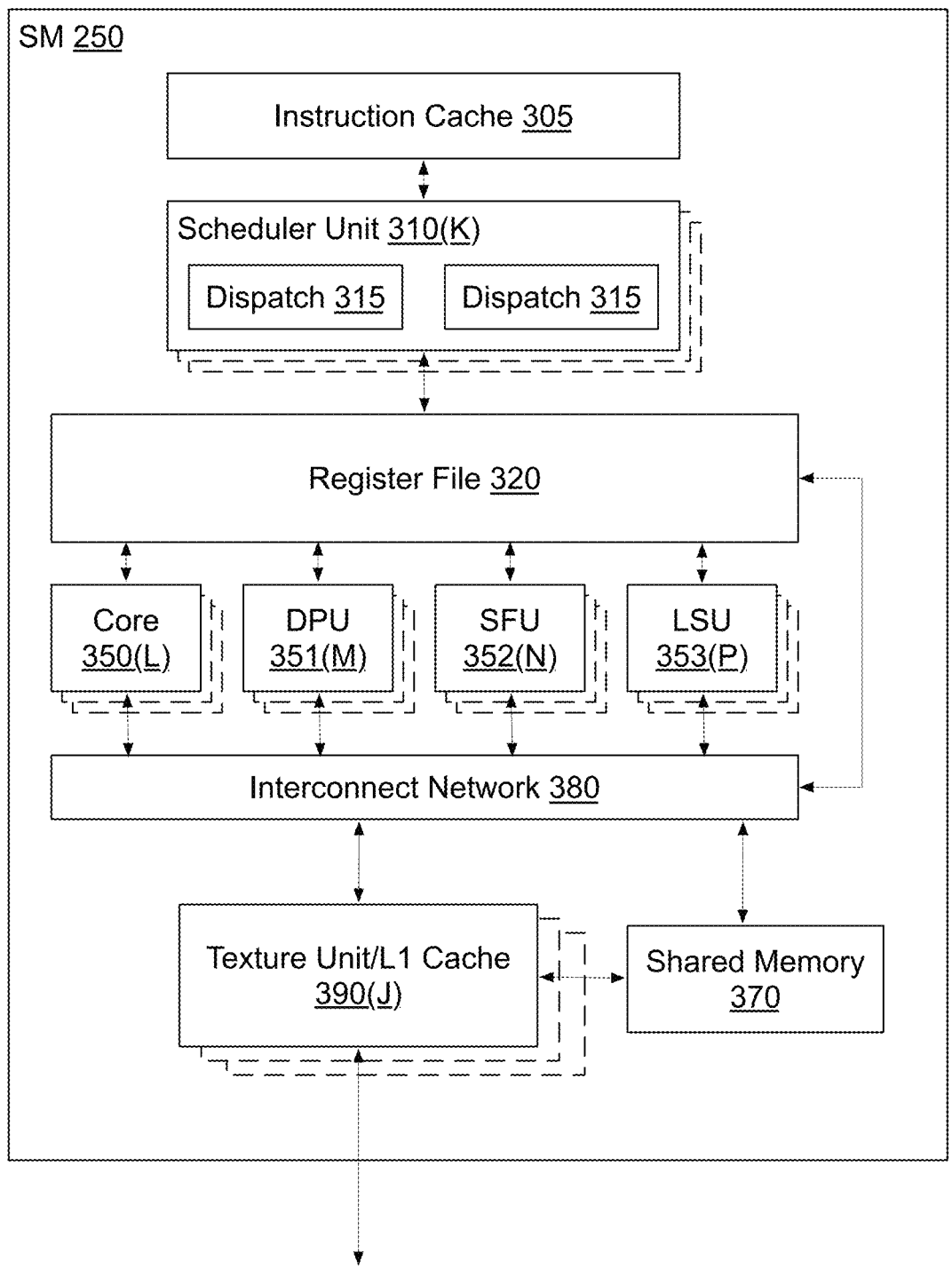
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active thread block arrays for execution on one or more SMs 250 of the PPU 200. The scheduler unit 310 receives the thread block arrays from the work distribution unit 220 and manages instruction scheduling for one or more thread blocks of each active thread block array. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the J texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises J texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mipmaps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

Figure 4:
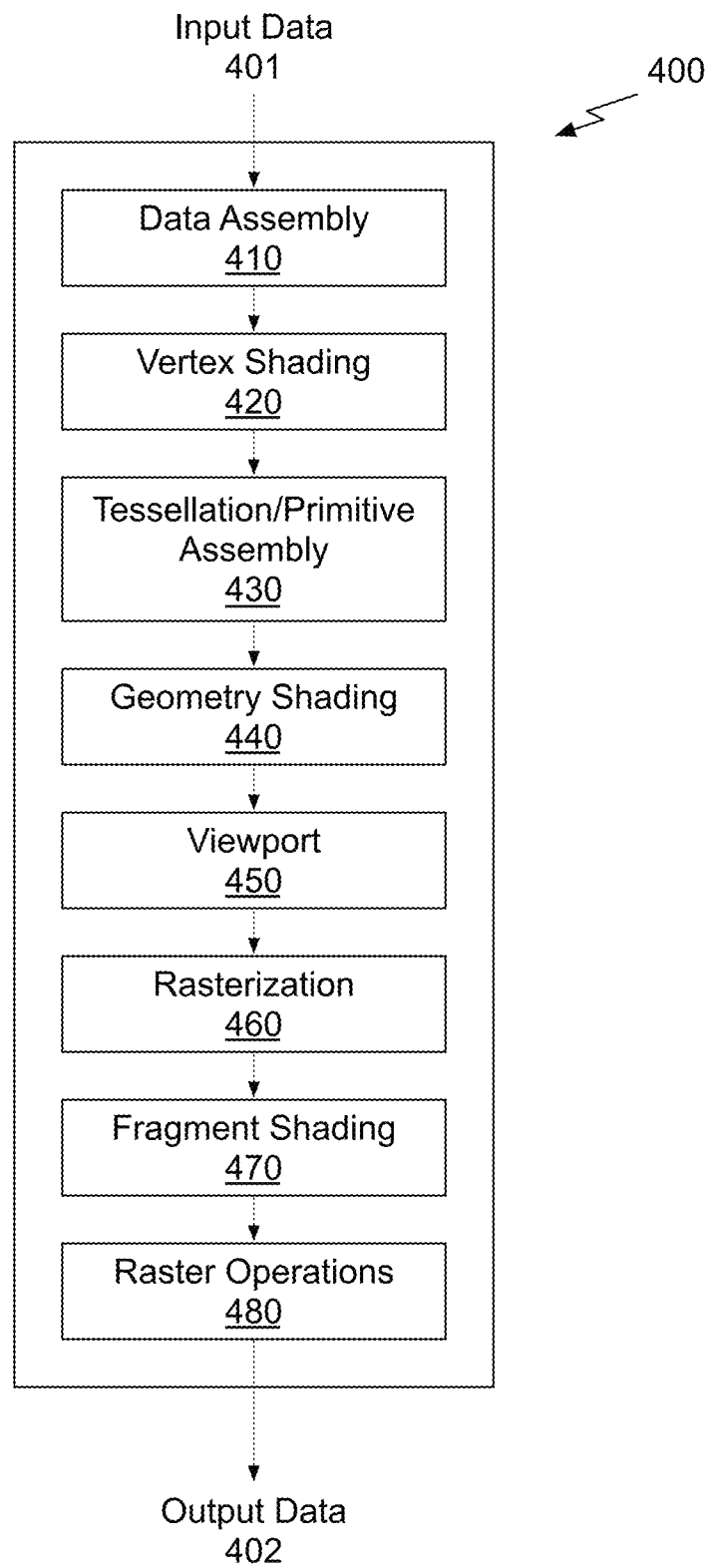
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API or by DirectX 11® by MICROSOFT.

As shown in FIG. 4, the graphics processing pipeline 400 comprises a pipeline architecture that includes a number of stages. The stages include, but are not limited to, a data assembly stage 410, a vertex shading stage 420, a tessellation/primitive assembly stage 430, a geometry shading stage 440, a viewport transform stage 450, a rasterization stage 460, a fragment shading stage 470, and a raster operations stage 480. In one embodiment, the input data 401 comprises commands that configure the processing units to implement the stages of the graphics processing pipeline 400 and process high-order geometric primitives (e.g., patches), as well as simpler geometric primitives (e.g., points, lines, triangles, quads, triangle strips or fans, etc.) to be processed by the stages. The output data 402 may comprise pixel data (i.e., color data) that is written into a frame buffer or other type of surface data structure in a memory. The SMs 250 may be configured by shader program instructions to function as one or more shading stages (e.g., vertex, hull, domain, geometry, and pixel shading stages) and write pixel data to the memory 204.

The data assembly stage 410 receives the input data 401 that specifies vertex data for high-order geometry. The data assembly stage 410 collects the vertex data defining the high-order graphics geometry in a temporary storage or queue, such as by receiving a command from the host processor that includes a pointer to a buffer in memory and reading the vertex data from the buffer. In one embodiment, a memory system may include one or more of the memory 204, the L2 cache 265, and the texture unit/L1 cache 390. The vertex data is then transmitted to the vertex shading stage 420 for processing.

The vertex shading stage 420 processes vertex data by performing a set of operations (i.e., a vertex shader or a program) once for each of the vertices. Vertices may be, e.g., specified as a 4-coordinate vector associated with one or more vertex attributes. The vertex shading stage 420 may manipulate properties such as position, color, texture coordinates, and the like. In other words, the vertex shading stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 420 generates transformed vertex data that is transmitted to the tessellation/primitive assembly stage 430.

The tessellation/primitive assembly stage 430 collects vertices output by the vertex shading stage 420 and tessellates patches represented by the vertices and control points into geometric primitives. In one embodiment, the tessellation/primitive assembly stage 430 groups the vertices into geometric primitives for processing by the geometry shading stage 440. For example, the tessellation/primitive assembly stage 430 may be configured to group every three consecutive vertices as a geometric primitive (i.e., a triangle) for transmission to the geometry shading stage 440. In some embodiments, specific vertices may be reused for consecutive geometric primitives (e.g., two consecutive triangles in a triangle strip may share two vertices). The primitive assembly stage 430 transmits geometric primitives (i.e., a collection of associated vertices) to the geometry shading stage 440.

The geometry shading stage 440 processes geometric primitives by performing a set of operations (i.e., a geometry shader or program) on the geometric primitives. Geometry shading operations may generate one or more geometric primitives from each geometric primitive. In other words, the geometry shading stage 440 may subdivide each geometric primitive into a finer mesh of two or more geometric primitives for processing by the rest of the graphics processing pipeline 400. The geometry shading stage 440 transmits geometric primitives to the viewport stage 450.

The viewport stage 450 performs a viewport transform, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 460.

The rasterization stage 460 converts the 3D geometric primitives into 2D fragments. The rasterization stage 460 may be configured to utilize the vertices of the geometric primitives to setup a set of surface equations from which various attributes can be interpolated. In one embodiment, the surface equations are plane equations in the form Ax+By+C, where x and y are sample locations and A, B, and C are plane equation parameters. In other embodiments, a surface equation specifies a high-order surface such as a patch. The rasterization stage 460 may also compute a coverage mask for a plurality of pixels that indicates whether one or more screen-space sample locations for the plurality of pixels intersect the geometric primitive.

The rasterization stage 460 may be configured to perform early z-testing based on per-vertex depth values to remove geometric primitives that will not be visible. Early z-testing avoids processing pixels for a graphics primitive that is behind, and therefore, occluded by another graphics primitive. Early z-testing is performed before shading operations, to avoid the expense of performing shading operations that will not contribute to the final color values of pixels in the image. The shading operations produce shaded fragments representing color data for the graphics primitives that cover at least one sample of a pixel and survived the early z testing. After the shading operations, comprehensive z-testing may be performed to remove shaded fragments that are occluded and therefore not visible in the image, so that color data for the non-visible shaded fragments are not written to a pixel of the image. The rasterization stage 460 transmits fragment data including the coverage masks and interpolated per-vertex attributes to the fragment shading stage 470.

The fragment shading stage 470 processes fragment data by performing a set of operations (i.e., a fragment shader or a program) on each of the fragments. The fragment shading stage 470 may generate shaded fragment data (i.e., shaded attributes such as color values) for the fragment such as by performing lighting operations or sampling texture maps using interpolated texture coordinates for the fragment. The shaded fragment data may be per-sample shaded attributes where one or more samples within a pixel share the same computed shaded attribute value or where a shaded attribute value is computed for each sample location within a pixel. The fragment shading stage 470 generates per-sample shaded fragment data that is transmitted to the raster operations stage 480. The fragment shading stage 470 is described in further detail in conjunction with FIGS. 5A-E, 6A-F, 7A, and 7B.

The raster operations stage 480 may perform various operations on the shaded fragment data such as performing alpha tests, Z-test, stencil tests, and blending the shaded fragment data with other pixel data corresponding to other fragments associated with the pixel. When the raster operations stage 480 has finished processing the shaded fragment data to produce pixel data (i.e., the output data 402), the pixel data may be written to a display surface (i.e., render target such as a frame buffer, a color buffer, Z-buffer, or the like). The raster operations stage 480 may perform per-sample z-testing so that visible fragment data is written to the frame buffer and obscured fragment data is not written to the frame buffer.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 440). Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

The Dynamic Object-Space Grid

As previously explained in conjunction with FIG. 1A, an object-space shading grid is defined for the object based on coordinates of triangle primitives in the object-space. In the context of the present description, barycentric coordinates may define the the local coordinate system enclosed within triangle primitives and the barycentric coordinates may also define points of the shading grid, so that the shading grid is a triangular shading grid.

FIGS. 5A-5C illustrate a mipmapped object-space shading grid that is defined for a primitive 500, in accordance with another embodiment. FIG. 5A illustrates a mip level 510 of the mipmapped object-space shading grid that is defined for a primitive 500, in accordance with another embodiment. The triangular primitive 500 is defined by the vertices 501, 502, and 503 and the mip level 510 of the mipmapped object-space shading grid is the coarsest mip level. In contrast with a conventional mipmapped texture map, in one embodiment only vertex positions define each level of the shading grid. In other words, no attribute data, such as color is associated with the vertices. The mipmapped object-space shading grid is a framework of points at which attributes may be computed rather than an array of texel or attribute values. In one embodiment, points of the mipmapped object-space shading grid are not stored and are instead generated from the primitives defining objects as needed to compute shaded samples. In such an embodiment, the mipmapped object-space shading grid is a procedural object-space shading grid.

In one embodiment, each of the vertices 501, 502, and 503 is associated with a set of barycentric coordinates. Each of the vertices 501, 502, and 503 is also a point (i.e., intersection) in the object-space shading grid that is defined for the primitive 500. The object-space shading grid may be used to compute a shaded sample at the sample location 505A. In one embodiment, shaded values are computed for the grid points at vertices 501, 502, and 503 and interpolation is used to compute the shaded sample at the sample location 505A. In one embodiment, barycentric interpolation is used to compute the shaded sample at the sample location 505A. The sample location 505A corresponds to a sample location in screen space that has been transformed into the object-space specific to the primitive 500. The object-space shading grid is "sampled" according to a shading rate that is computed based on a specified shading rate (i.e., the number of samples specified for each screen-space pixel) and screen-space derivatives of the object-space coordinates of the input fragment. Unlike the specified shading rate, the computed shading rate may vary within each parent primitive and is therefore a dynamic shading rate. The primitive 500 is a "parent" primitive that may be divided into sub-primitives (e.g., triangles) as shown in FIGS. 5B and 5C. The computed shading rate for a sub-primitive that comprises two or more sub-primitives may also vary within the sub-primitive. Importantly, the computed shading rate may also differ from the visibility rate. The visibility rate is the number of samples for which z-tests are performed during early and/or late z-testing. In one embodiment, the visibility rate and the specified shading rate may each be fixed and the computed shading rate may vary so that the computed shading rate for a first set of primitives is greater than the visibility rate for the first set of primitives and the computed shading rate for a second set of primitives may be less than or equal to the visibility rate for the second set of primitives.

In one embodiment, the object-space shading grid is mipmapped and one or more levels of the mipmapped object-space shading grid are sampled according to the computed shading rate. In traditional mipmapping, texels at coarse levels of the mipmap are computed by recursively filtering the texels at finer levels. Consequently, the texel(s) at the coarsest mip level depend on all texels at the finest level and are not known until the finest level texel values are available. While possible, it is impractical to use the same technique for computing shaded values for the grid points of a mipmapped shading grid. Rather than pre-computing the shaded values for each point of a mipmapped shading grid, the shaded values are computed as needed (i.e., dynamically) to generate a shaded sample. Similarly, the points of the mipmapped shading grid are deterministic and may also be defined dynamically.

FIG. 5B illustrates another mip level 520 of the object-space mipmapped shading grid that is defined for the primitive 500, in accordance with another embodiment. In one embodiment, the sub-triangles are substantially equal in area. Additional vertices 511, 512, and 513 are determined in the mip level 520 of the object-space shading grid to define four sub-triangles. Each of the vertices 501, 502, 503, 511, 512, and 513 is also a point (i.e., intersection) in the mipmapped object-space shading grid that is defined for the primitive 500. In one embodiment, shaded values are computed for the grid points at vertices 501, 511, and 512 and interpolation (e.g. barycentric interpolation) is used to compute the shaded sample at the sample location 505B. The sample location 505B is substantially coincident with the sample location 505A relative to the vertices 501, 502, and 503. In one embodiment, a first shaded sample is computed at the sample location 505B using the mip level 520 and a second shaded sample is computed at the sample location 505A using the mip level 510. The first and second shaded samples are then interpolated to compute the final shaded sample at the sample location 505B.

FIG. 5C illustrates yet another mip level 530 of the object-space mipmapped shading grid that is defined for the primitive 500, in accordance with another embodiment. Additional vertices 521, 522, 523, 531, 532, 533, 540, 545, and 550 are determined in the mip level 530 of the object-space shading grid. Each of the vertices 521, 522, 523, 531, 532, 533, 540, 545, and 550 is also a point (i.e., intersection) in the mipmapped object-space shading grid that is defined for the primitive 500. In one embodiment, shaded values are computed for the grid points at vertices 522, 531, and 550 and interpolation is used to compute the shaded sample at the sample location 505C. The sample location 505C is substantially coincident with the sample locations 505A and 505B relative to the vertices 501, 502, and 503. In one embodiment, a first shaded sample is computed at the sample location 505C using the mip level 530 and a second shaded sample is computed at the sample location 505B using the mip level 520. The first and second shaded values are then interpolated to compute the final shaded sample at the sample location 505C.

In one embodiment, FIGS. 5A-5C illustrate three levels of barycentric subdivision for the primitive 500 and the object-space shading grid is a barycentric shading grid. At the coarsest level shown in FIG. 5A, shaded values are computed for the grid points that are coincident with the three vertices 501, 502, and 503 of the parent primitive 500. To obtain each subsequent higher-resolution level, the previous level is subdivided into substantially congruent sub-triangles. In contrast, the generation of a mipmapped texture map processes (e.g. filters) the highest resolution texture map to produce each subsequent lower-resolution level. As shown in FIGS. 5A, 5B, and 5C, binary subdivision is used to subdivide each triangle at a level into 4 sub-triangles at a finer level. It is not necessary for barycentric shading grids to employ binary subdivision, so other sub-division schemes may be used. For example, in another embodiment, each triangle is subdivided into 9 sub-triangles at a finer level.

In contrast with a texture map, a barycentric shading grid for a primitive is fully contained within the domain of the triangle primitive, whereas texture maps often span multiple triangles. A barycentric shading grid is defined using barycentric coordinates of the parent primitive, so a barycentric shading grid does not require an external parameterization. In contrast, texture maps rely on parameterization using texture coordinates.

FIG. 5D illustrates an object-space shading grid 555 that is defined for a narrow primitive 560, in accordance with another embodiment. Vertices 561, 562, and 563 define the primitive 560 and are points in the mipmapped object-space shading grid that is defined for the primitive 560. Additional vertices 565, 571, 581, 591, 572, 582, 592, 573, 583, 593, 575, 580, 585, 582, and 592 are determined in the object-space shading grid 555. Each of the vertices 565, 571, 581, 591, 572, 582, 592, 573, 583, 593, 575, 580, 585, 582, and 592 is also a point (i.e., intersection) in the object-space shading grid 555 that is defined for the primitive 560.

Use of the object-space shading grid 555 differs compared with the mipmapped object-space grid shown in FIGS. 5A, 5B, and 5C because shaded values are not computed at the "virtual" points 575, 580, 585, 582, and 592. Instead, when a shaded value is needed at one of the virtual points 575, 580, 585, 582, and 592, shaded values are computed at neighboring points and interpolated to compute a shaded value at the respective virtual point. In one embodiment, linear interpolation is used to compute a shaded value at one or more of the virtual points 575, 580, 585, 582, and 592. For example, a shaded value at the virtual point 585 may be computed by interpolating shaded values computed at the points 591 and 565. Similarly, a shaded value at the virtual point 575 may be computed by interpolating shaded values computed at the points 571 and 573. A shaded value at the sample location 595 may be computed by interpolating shaded values computed at virtual points 575, 585, and 580.

Referring back to FIGS. 5A, 5B, and 5C, the sample locations 505A, 505B, and 505C, respectively within the object-space shading grid is used to interpolate the shaded values at the points on the object-space shading grid. When a mipmapped object-space shading grid is used, it is also necessary to determine which level(s) of the mipmapped object-space shading grid are sampled. In one embodiment, the computed shading rate is used to determine one or more levels of the mipmapped object-space shading grid that are sampled.

Sampling the Object-Space Shading Grid

Following rasterization, the input that is received for shading is a screen-space pixel fragment. When a square shaped pixel is completely covered by a primitive of an object, the pixel fragment is square shaped. When a square shaped pixel is partially covered by a primitive of an object, the pixel fragment may be polygon shaped. The input fragment is transformed from screen-space into object-space to produce a footprint of the input fragment in object-space. Based on the specified shading rate for the input fragment (e.g., samples per pixel), the mip level of the object-space shading grid is identified that best approximates the footprint. In one embodiment, screen-space derivatives of the object-space barycentric coordinates of the input pixel fragment are used to estimate the size of a sub-triangle whose area and sample count approximates the specified shading rate. In other words, screen-space derivatives of the pixel fragment footprint's barycentric coordinates in object-space are used to calculate the computed shading rate.

FIG. 6A illustrates sample pattern for a pixel 600, in accordance with one embodiment. In one embodiment, the sample pattern for the pixel 600 comprises four sub-pixel samples located at the center of each quadrant (shown as cross-hairs in FIG. 6A). In another embodiment, the sample pattern for the pixel 600 may be jittered (i.e., randomly distributed throughout the pixel) in order to alleviate the aliasing artifacts. As shown in FIG. 6A, the jittered sample locations for each pixel may be shown by the small circles offset from each quadrant's center.

FIG. 6B illustrates a pixel fragment 602 in screen-space, in accordance with one embodiment. In one embodiment, the pixel fragment 602 comprises a single pixel, such as the pixel 600 with four sub-pixel sample locations (shown as circles). In another embodiment, the pixel fragment 602 comprises four pixels, each with one sub-pixel sample location. The pixel fragment 602 is a portion of the primitive 605 that has passed visibility testing (i.e., early z testing).

FIG. 6C illustrates a footprint 610 of the pixel fragment 602 in object-space, in accordance with one embodiment. The input pixel fragment 602 is transformed from screen-space to produce the footprint 610 in object-space. In one embodiment, the footprint 610 is defined by barycentric coordinates.

The primitive 605 is shown in object-space as primitive 618. The object-space shading grid that is defined for primitive 618 comprises sixteen sub-triangles. In one embodiment, the object-space shading grid shown in FIG. 6C is one level of a mipmapped object-space shading grid for the primitive 618. To shade the four sample locations of the footprint 610, shaded values should be computed for points 611, 612, 613, 614, 615, 616, and 617 of the object-space shading grid. In one embodiment, each of the points 611, 612, 613, 614, 615, 616, and 617 is defined by barycentric coordinates. As shown in FIG. 6C, the shaded values computed at points 611, and 614 are shared between two of the shaded sample locations defining the footprint 610 and the shaded value computed at point 615 is shared between all four of the shaded sample locations defining the footprint 610. The reuse of shaded values helps to amortize the shading computations over multiple shading requests.

Optimistically assuming that each shaded value will typically be shared between 6 sub-triangles, the sample count for each sub-triangle may be set to ½. Given the specified screen-space shading rate of R shading samples per pixel, N is computed, where N is the approximate number of per-edge subdivisions such that the area of the enclosing sub-triangle $\Delta_N$ is approximately $$\Delta_N = \frac{1}{2 \cdot R}$$

Therefore, N identifies the mip level of the mipmapped object-space shading grid that should be used to compute the shaded samples for a footprint.

The two nearest powers of 2 to N may be used identify two mip levels of the object-space shading grid. A linear interpolant between the two mip levels may be determined that corresponds to the footprint of the input pixel fragment. In one embodiment, N may be computed using derivatives of the coordinates of the pixel fragment footprint in object-space. The derivatives of the object-space barycentric coordinates of a pixel fragment F provide an estimate of the rate of change of the extent of a parent triangle primitive T in the pixel fragment's neighborhood. For example, derivatives of the object-space barycentric coordinates of the footprint 610 may be used to estimate the rate of change of the extent of primitive 605 in object-space. Consider virtual triangle $T_d$ with identical derivatives at F, but uniform derivatives across $T_d$. If $\{d\alpha, d\beta, d\gamma\}$ represent the barycentric derivatives, $\{h_A, h_B, h_C\}$ as defined below represent the three altitudes of $T_d$ measured in pixels.

$$\{d\alpha, d\beta, d\gamma\} = \left\{\left(\frac{d\alpha}{dx}, \frac{d\alpha}{dy}\right), \left(\frac{d\beta}{dx}, \frac{d\beta}{dy}\right), \left(\frac{d\gamma}{dx}, \frac{d\gamma}{dy}\right)\right\}$$

$$\{h_A, h_B, h_C\} = \left\{\frac{1}{|d\alpha|}, \frac{1}{|d\beta|}, \frac{1}{|d\gamma|}\right\}$$

The altitudes of $T_d$ may be used to estimate the area of $T_d$ in pixels $\Delta_d$:

$$\Delta_d = \frac{1}{\sqrt{\left(\frac{1}{h_A} + \frac{1}{h_B} + \frac{1}{h_C}\right)}} \cdot \frac{1}{\sqrt{\left(-\frac{1}{h_A} + \frac{1}{h_B} + \frac{1}{h_C}\right)}} \cdot$$

$$\frac{1}{\sqrt{\left(\frac{1}{h_A} - \frac{1}{h_B} + \frac{1}{h_C}\right)}} \cdot \frac{1}{\sqrt{\left(\frac{1}{h_A} + \frac{1}{h_B} - \frac{1}{h_C}\right)}} =$$

$$\frac{1}{\sqrt{(|d\alpha| + |d\beta| + |d\gamma|)}} \cdot \frac{1}{\sqrt{(-|d\alpha| + |d\beta| + |d\gamma|)}} \cdot$$

$$\frac{1}{\sqrt{(|d\alpha| - |d\beta| + |d\gamma|)}} \cdot \frac{1}{\sqrt{(|d\alpha| + |d\beta| - |d\gamma|)}}$$

$\Delta_d$ may be used to estimate the area of a sub-triangle after $N_d$ per-edge subdivisions $\Delta_{N,d}$ and substitute its relation with specified shading rate R:

$$\Delta_{N,d} = \frac{\Delta_d}{N_d^2} = \frac{1}{2 \cdot R}$$

Thus, given $\Delta_d$ and R, $N_d$ may be estimated as:

$$N_d = \sqrt{2 \cdot \Delta_d \cdot R}$$

$N_d$ obtained above is not necessarily consistent across the shared edge between triangles and inconsistencies can produce visual seams along triangle edges. To avoid seam artifacts, an edge-consistent level of subdivision may be blended near triangle edges. In one embodiment, a precomputed per-vertex average incident area $\Delta_{avg}^i$ is interpolated at the fragment F:

$$\Delta_{avg} = \alpha \cdot \Delta_{avg}^0 + \beta \cdot \Delta_{avg}^1 + \gamma \cdot \Delta_{avg}^2$$

Dividing $\Delta_{avg}$ by T's world-space area $\Delta_{ws}$ provides an edge-consistent area $\Delta_c$ and corresponding $N_d$ near triangle edges. A dynamic blend factor may be used such that the size of the blend region $P_{blend}$ can be specified in pixels.

$$\Delta_c = \Delta_d \cdot \frac{\Delta_{avg}}{\Delta_{ws}}$$

$$N_c = \sqrt{2 \cdot \Delta_c \cdot R}$$

$$f_{smooth} = LinearStep\left(0.0 \frac{P_{blend}}{N_d}, \min(\alpha, \beta, \gamma)\right)$$

$$N = (1 - f_{smooth}) \cdot N_c + f_{smooth} \cdot N_d$$

In addition to identifying the two nearest mipmap levels of the object-space shading grid using N, the sub-triangles that enclose the barycentric coordinates defining the pixel fragment footprint in object-space need to be identified to compute the shaded values and the shaded samples.

FIG. 6D illustrates two nearest mip levels of a mipmapped object-space grid 620 that are used to generate a shaded sample for the sample location, in accordance with one embodiment. Based on the value of N that is calculated for the primitive 605, the mip levels 621 and 622 of the object-space shading grid are identified and a linear interpolant is determined. The sample location 625 lies within a first sub-triangle defined by points 611, 615, and 617 and within a second sub-triangle defined by points 619, 617, and 613.

Given a discretized mip level N, the enclosing sub-triangle for the fragment F:

$$\{k_\alpha, k_\beta, k_\gamma\} = \{\lfloor \alpha \cdot N \rfloor, \lfloor \beta \cdot N \rfloor, \lfloor \gamma \cdot N \rfloor\},$$

$\{k_\alpha, k_\beta, k_\gamma\}$ uniquely identifies a sub-triangle. If $(k_\alpha+k_\beta+k_\gamma)$ is even, it represents an inverted sub-triangle (facing against the parent triangle), otherwise the sub-triangle aligns with the parent triangle.

The barycentric coordinates within the enclosing sub-triangle $\{\alpha_N, \beta_N, \gamma_N\}$ may also be obtained using the expression for $\alpha_N$:

$$\alpha_N = \begin{cases} 1 + \lfloor \alpha \cdot N \rfloor - (\alpha \cdot N), & \text{if inverted sub-triangle} \\ (\alpha \cdot N) - \lfloor \alpha \cdot N \rfloor, & \text{otherwise} \end{cases}$$

Figure 6E:
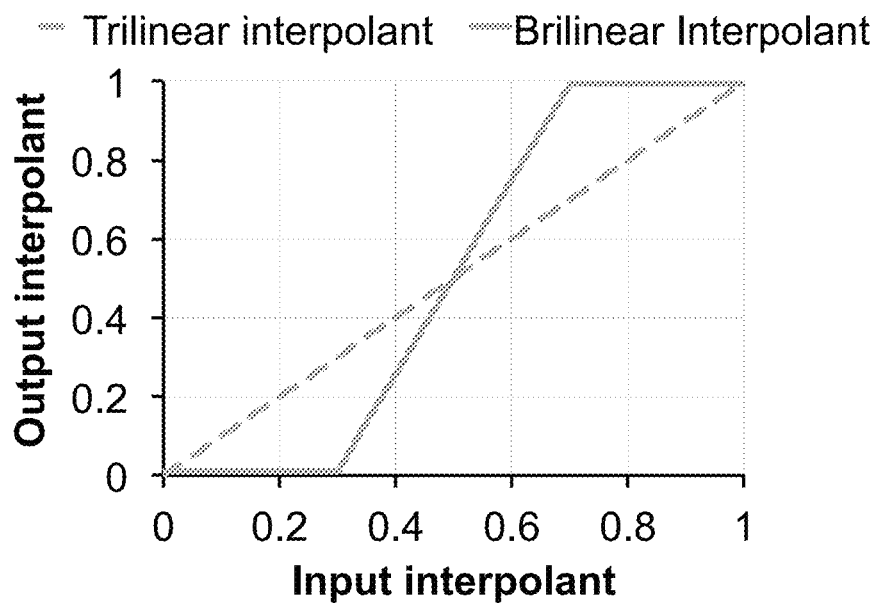
FIG. 6E illustrates remapping of interpolants to use one of two nearest mip levels of a mipmapped object-space grid, in accordance with one embodiment.

FIG. 6E illustrates remapping of linear interpolants to use one of two nearest mip levels of a mipmapped object-space grid, in accordance with one embodiment. As previously explained, a linear interpolant between the two closest mip levels may be determined that corresponds to the footprint of the input pixel fragment. In one embodiment, when the linear interpolant is close to 0 or 1, the linear interpolant is remapped so that only one of the two mip levels is used, reducing the number of shaded values and shaded samples that are computed. For example, referring to FIG. 6D, the shaded sample for the sample location 625 may be computed by interpolating the shaded values computed for either points 611, 615, and 617 or points 613, 617, and 619. As shown in FIG. 6E, when the linear interpolant is 0.0-0.3, only points of the coarser mip level are used (e.g., mip level 622) and when the linear interpolant is 0.7-1.0 only points of the finer mip level are used (e.g., mip level 621).

After the points in the grid that are needed to compute the shaded sample are identified, shader invocations are launched at each point. In one embodiment, shaded values computed at the points of the object-space grid are stored in a cache or memory, so that shaded values that have already been computed are not recomputed. In one embodiment, requests from several fragments may be aggregated, duplicates may be identified and removed, and shader evaluations may then be launched for execution in a data-parallel fashion.

When the specified shading rate is lower than the rate of visibility, the footprint of nearby pixel fragments generally have a significant overlap. To avoid redundant shader evaluations for the overlapping points on the object-space grid, the output of shader evaluation should be reused. When the footprint of a pixel fragment has been computed, the output may be checked to determine if any of the requested shaded values is either already computed or currently being computed. For such shaded values, shader evaluations are not launched and instead the already available output is used or the output of a current evaluation is used when the evaluation is finished. In one embodiment, reuse is achieved using a cache that contains previously computed shaded values and also identifies requests that are incomplete.

The shaded values that are output may also be shared between primitives (parent primitives and/or sub-triangles). In one embodiment, whenever two primitives share an edge or a vertex, the points of the object-space grids for the two primitives that lie on the shared edge/vertex are co-located. If a surface shader is driven by per-vertex attributes, shader inputs at the shared points are also identical. In such a scenario, the shaded values for the shared points may be reused between multiple primitives. Cross-primitive reuse is especially beneficial for scenes with small triangles, where the proportion of shading samples lying on edges or vertices is high. In one embodiment, for extremely dense meshes, vertex shading may be used.

Object-Space Shading

When the object-space shading grid is a barycentric grid, the points that are shaded always belong to the same base triangle. As a consequence, evaluating attributes at a point can be accomplished by barycentric interpolation of the primitive vertex attributes. Shaders often utilize derivatives to estimate the extent of the current shading element (e.g., pixel, pixel group), which is useful in appropriately filtering to produce intermediate attribute values. Screen-space shading systems, such as modern GPUs, typically compute attribute derivatives using finite differences across 2×2 pixel quad shading elements. In contrast, object-space shading systems typically obtain derivatives based on the size of the object-space shading element, e.g. sub-triangle. However, actual sizes of object-space shading elements do not usually match the specified shading rate perfectly, which can result in discontinuous derivatives. Additionally, the shapes of a pixel and a pixel quad in screen space (square or rectangular) may be quite different compared with the shape of an object-space shading element (triangular) which can result in derivative mismatches. Consequently, in one embodiment, the object-space derivatives are adjusted to account for the specified shading rate. Derivatives adjusted in this manner are also known as smooth derivatives.

For shading using barycentric shading grids, derivatives may be computed using finite differences across sub-triangles in the shading grid. When finite differences are used, derivative operations on arbitrary functions may be performed, including dependent functions like texture fetches. In one embodiment, shaded samples are computed for points in groups of 3 or 4 to ensure that finite differences are available to compute the derivatives. When finite differences are computed for pixel quads, the finite differences belong to an orthonormal basis. In contrast, finite differences computed for a group of points of a barycentric shading grid do not belong to an orthonormal basis. As a result, the derivatives are recalculated on an orthonormal basis before the shaded sample (e.g. attribute) is generated.

In one embodiment, finite differences are transformed to an orthonormal basis using the following technique. Given a function $f(x,y)$, with values $f_0$, $f_1$, and $f_2$ at the three vertices $v_0=(x_0,y_0)$, $v_1=(x_1,y_1)$, and $v_2=(x_2,y_2)$ of a sub-triangle, the partial derivatives $$\left(\frac{\partial f}{\partial x}, \frac{\partial f}{\partial y}\right)$$

may be computed on an orthonormal basis.

Figure 6F:
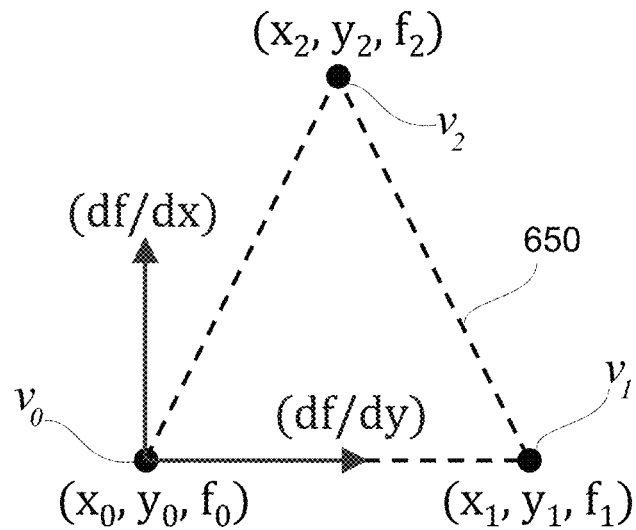
FIG. 6F illustrates finite differences on a sub-triangle that are transformed to compute derivatives in an orthonormal basis, in accordance with one embodiment.

FIG. 6F illustrates finite differences on a sub-triangle that are transformed to compute derivatives in an orthonormal basis, in accordance with one embodiment. The sub-triangle 650 is defined by the three vertices $v_0$, $v_1$, and $v_2$.

Assuming $f$ to be linear in the region:

$$f_1 = f_0 + \frac{\partial f}{\partial x} \cdot (x_1 - x_0) + \frac{\partial f}{\partial y} \cdot (y_1 - y_0)$$

$$f_2 = f_0 + \frac{\partial f}{\partial x} \cdot (x_2 - x_0) + \frac{\partial f}{\partial y} \cdot (y_2 - y_0)$$

This system of equations can be expressed as $Af'=B$, where:

$$A = \begin{pmatrix} x_1 - x_0 & y_1 - y_0 \\ x_2 - x_0 & y_2 - y_0 \end{pmatrix}$$

$$B = \begin{pmatrix} f_1 - f_0 \\ f_2 - f_0 \end{pmatrix}$$

$$f' = \left(\frac{\partial f}{\partial x}, \frac{\partial f}{\partial x}\right)^T$$

The system of equations may be solved for non-degenerate triangles using Cramer's rule:

$$\left(\frac{\partial f}{\partial x}, \frac{\partial f}{\partial y}\right) = \left(\frac{A_{11}B_0 - A_{01}B_1}{|A|}, \frac{A_{00}B_1 - A_{10}B_0}{|A|}\right)$$

For object space derivatives, A is constructed assuming $(x_1-x_0)=1$ and $(y_1-y_0)=0$, and set $(x_2-x_0)$ and $(y_2-y_0)$ using the ratio of lengths and the angle between $(v_2-v_0)$ and $(v_2-v_0)$.

In order to provide consistent derivatives that closely correspond to the specified shading rate, screen-space can be optionally used as the orthonormal basis while the derivatives are recalculated. Using screen-space helps obtain accurate screen-space derivatives, but at the cost of extra computation.

When screen-space derivatives are computed, A is constructed to correspond to the actual screen-space locations of the vertices of the sub-triangle. Let these locations be $S_0$, $S_1$, and $S_2$ respectively.

$$A = \begin{pmatrix} S_x^1 - S_x^0 & S_y^1 - S_y^0 \\ S_x^2 - S_x^0 & S_y^2 - S_y^0 \end{pmatrix}$$

The terms of A are screen-space coordinates, estimated by transforming vertices of the local triangle. In other words, $$S_x^i = -\frac{H \cdot V_x^i}{2 \cdot V_z^i \cdot \tan\left(\frac{\theta}{2}\right)} = -f_s \cdot \frac{V_x^i}{V_z^i}$$

$$S_y^i = -\frac{H \cdot V_y^i}{2 \cdot V_z^i \cdot \tan\left(\frac{\theta}{2}\right)} = -f_s \cdot \frac{V_y^i}{V_z^i}$$

Where $V_x^i$, $V_y^i$, $V_z^i$ are the eye-space coordinates of the local triangle, H is the height of the viewpoint in pixels, and $\theta$ is the vertical field of view. Substituting H and $\theta$ into A, produces:

$$A = -f_s \cdot \begin{pmatrix} \frac{V_x^1}{V_z^1} - \frac{V_x^0}{V_z^0} & \frac{V_y^1}{V_z^1} - \frac{V_y^0}{V_z^0} \\ \frac{V_x^2}{V_z^2} - \frac{V_x^0}{V_z^0} & \frac{V_y^2}{V_z^2} - \frac{V_y^0}{V_z^0} \end{pmatrix}$$

Then $\delta^i$ is defined as the following:

$$\delta^i = V_i - V_0$$
$$= \frac{V_i^{par} - V_0^{par}}{N}$$
$$= \frac{\Delta^i}{N}$$

Where $V_i^{par}$ are the parent triangle's vertices in eye space, and $\Delta^i=(V_1^{par}-V_0^{par})$. $V_i^{par}$ is then substituted into A. For brevity only $A_{00}$ is shown for the next few steps. Other entries of A are similar in form.

$$A_{00} = -f_s\left(\frac{V_x^0 + \delta_x^1}{V_z^0 + \delta_z^1} - \frac{V_x^0}{V_z^0}\right)$$

$$= -f_s \cdot \left(\frac{V_z^0 \cdot \delta_x^1 - V_x^0 \cdot \delta_z^1}{V_z^0 \cdot (V_z^0 + \delta_z^1)}\right)$$

Approximating $V_z^0 \sim (V_z^0+\delta_z^i)$ in the denominator:

$$A_{00} = -\frac{f_s}{V_z^0} \cdot \left(\delta_x^1 - \frac{V_x^0}{V_z^0} \cdot \delta_z^1\right)$$

$$= -\frac{f_s}{N \cdot V_z^0} \cdot \left(\Delta_x^1 - \frac{V_x^0}{V_z^0} \cdot \Delta_z^1\right)$$

$$= -K \cdot \left(\Delta_x^1 - \frac{V_x^0}{V_z^0} \cdot \Delta_z^1\right)$$

Thus, A is now:

$$A = -K \cdot \begin{pmatrix} \Delta_x^1 - \frac{V_x^0}{V_z^0} \cdot \Delta_z^1 & \Delta_y^1 - \frac{V_y^0}{V_z^0} \cdot \Delta_z^1 \\ \Delta_x^2 - \frac{V_x^0}{V_z^0} \cdot \Delta_z^2 & \Delta_y^2 - \frac{V_y^0}{V_z^0} \cdot \Delta_z^2 \end{pmatrix}$$

|A| is computed as:

$$|A| = K^2 \cdot \left( \begin{vmatrix} \Delta_x^1 & \Delta_y^1 \\ \Delta_x^2 & \Delta_y^2 \end{vmatrix} + \frac{V_x^0}{V_z^0} \cdot \begin{vmatrix} \Delta_y^1 & \Delta_z^1 \\ \Delta_y^2 & \Delta_z^2 \end{vmatrix} + \frac{V_y^0}{V_z^0} \cdot \begin{vmatrix} \Delta_z^1 & \Delta_x^1 \\ \Delta_z^2 & \Delta_x^2 \end{vmatrix} \right)$$

All three determinants in the above expression are per-triangle constants, so the determinants only need to be computed once per triangle. Thus $$\frac{1}{|A|}$$

can be computed more easily than directly transforming vertices of the sub-triangle from object-space to screen-space. Computing derivatives in this fashion amortizes the computation required to compute one derivative across the triangle.

Figure 7A:
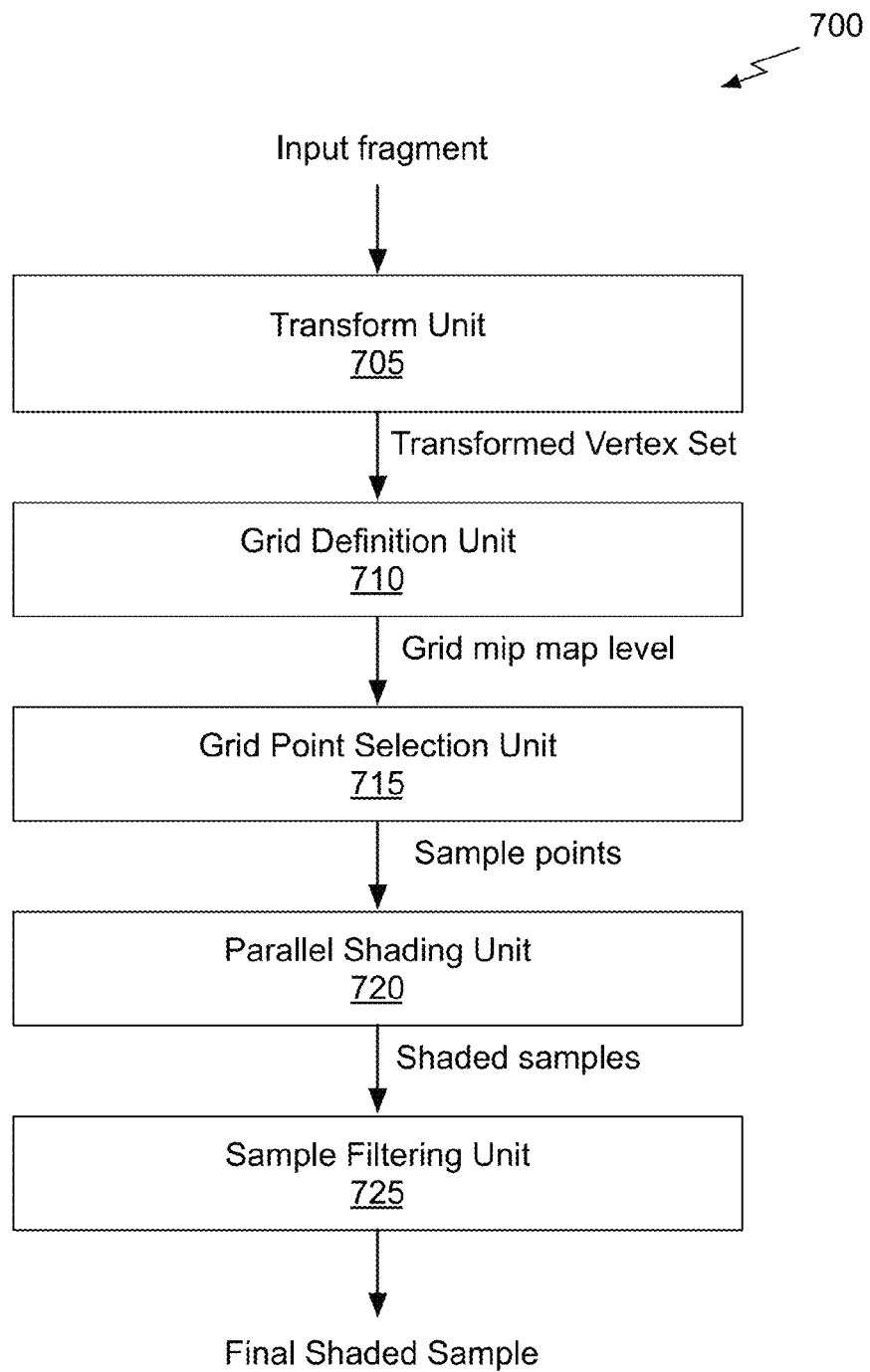
FIG. 7A illustrates a block diagram for identifying points of an object-space grid at which shaded samples will be computed, in accordance with one embodiment.

FIG. 7A illustrates a block diagram 700 for identifying points of an object-space shading grid at which shaded samples will be computed, in accordance with one embodiment. An input fragment that is defined by vertices in screen-space is received by a transform unit 705. The input fragment is at least one sub-pixel in size and may be larger than one or more pixels. The input fragment is a portion of an object that includes one or more primitives. When early z-testing is performed, the portion of the object corresponds to a visible portion of the object. The transform unit 705 transforms the vertices from screen space to object space to produce a transformed vertex set corresponding to the input fragment. The transformed vertices define a footprint of the input fragment in object-space.

A grid definition unit 710 receives the transformed vertex set and defines an object-space shading grid for each primitive that is covered by the footprint. In one embodiment, a separate, primitive-specific object-space shading grid is defined for each primitive. In another embodiment, an object-space shading grid is defined for two or more primitives that are covered by the footprint. The one or more object-space shading grids for a primitive or primitives may be successively subdivided into sub-triangles to generate a mipmapped object-space shading grid for the respective primitive or primitives. The grid definition unit 710 identifies at least one mip level to be sampled based on the footprint. In one embodiment, the grid definition unit 710 identifies at least one mip level having sub-triangles that most closely match the area of the footprint. In one embodiment, the grid definition unit 710 computes the value N and identifies the at least one grid mip level based on N. In one embodiment, when two or more grid mip levels are identified, the grid definition unit 710 also computes the linear interpolant needed to compute a shaded sample based on the shaded values corresponding to two or more grid mip levels.

A grid point selection unit 715 receives the at least one grid mip level and identifies one or more sub-triangles that intersect the sample locations, where the sample locations are the vertices that define the footprint. The grid point selection unit 715 selects points of the object-space shading grid for which shaded values are computed. The selected points are "sample points" corresponding to vertices of a sub-triangle that encloses a sample location.

After the points of the object-space shading grid at which shaded values will be computed are identified, a shaded value may be computed for each point. A parallel shading unit 720 receives the sample points and launches a shader to compute a shaded value at each sample point. The computed shaded samples may comprise one or more shaded attributes associated with the input fragment. In one embodiment, the shaded values are computed as described in conjunction with FIG. 7B.

The shaded values may then be filtered by a sample filtering unit 725 based on the linear interpolant related to N and the sample location relative to the sample points (i.e., vertices of the enclosing sub-triangle). In one embodiment, a shaded sample is computed using barycentric interpolation within a first mip level and a second mip level to generate a first and second shaded sample. The first and second shaded samples are then interpolated based on the linear interpolant related to N to produce the final shaded sample.

Figure 7B:
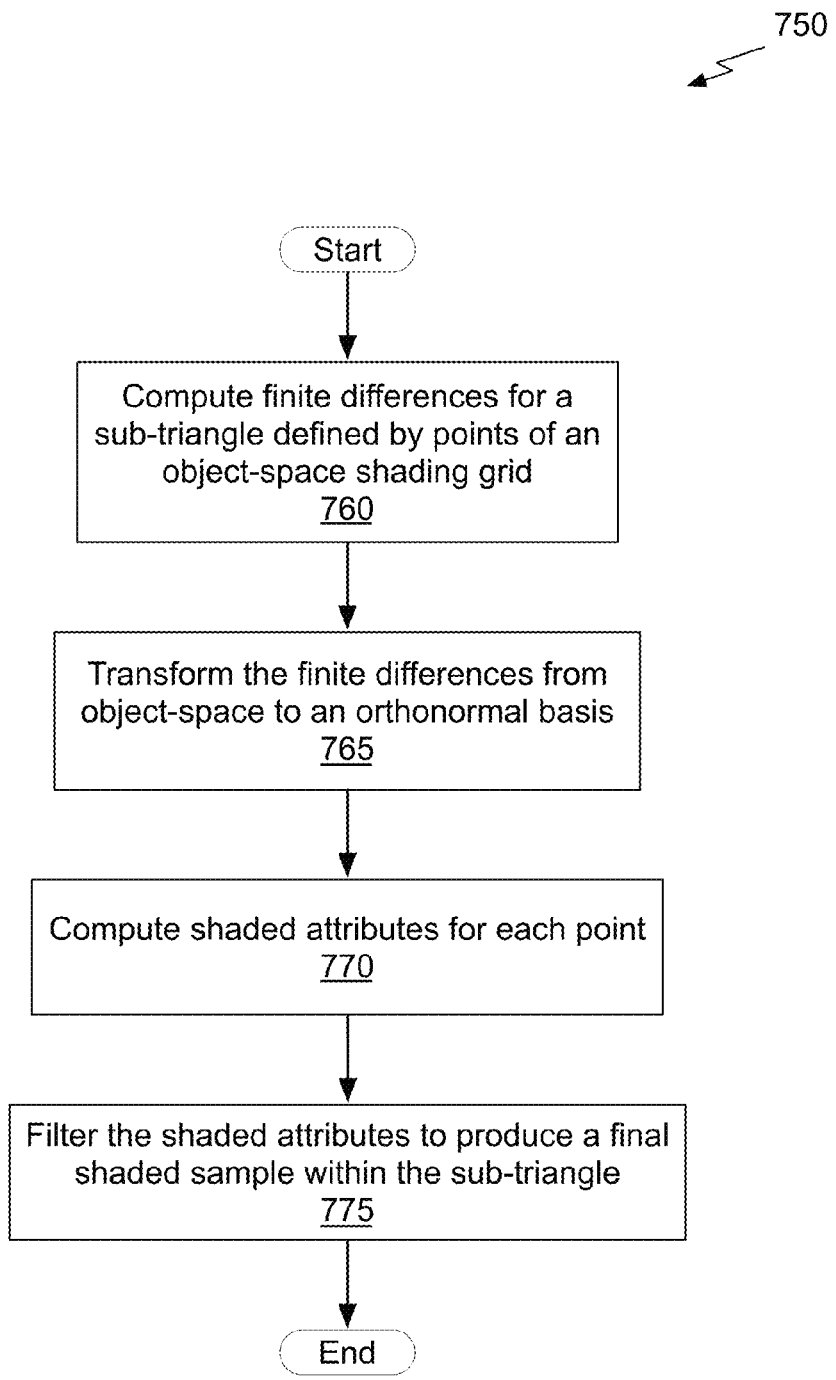
FIG. 7B illustrates a flowchart of a method for computing per-sample shaded attributes for pixels, in accordance with one embodiment.

FIG. 7B illustrates a flowchart of a method 750 for computing per-sample shaded attributes for pixels, in accordance with one embodiment. Performing the method steps, in any order, is contemplated as being within the context of this disclosure. One or more of the steps shown in FIG. 7B may be performed by the parallel shading unit 720 shown in FIG. 7A. At step 760, finite differences for a sub-triangle defined by points of an object-space shading grid are computed. In one embodiment, the processing pipeline may be the graphics processing pipeline 400 and the fragment shading stage 470 may be implemented by an SM 250 that is configured to execute instructions of the shader program. At step 765, the finite differences are transformed from object space to an orthonormal basis. In one embodiment, the orthonormal basis is screen space. At step 770, shaded attributes are computed for each point. At step 775, the shaded attributes are filtered to produce a final shaded sample within the sub-triangle. In one embodiment, step 775 is performed by the sample filtering unit 725 shown in FIG. 7A.

Because the shading is performed in object-space the temporal artifacts may be reduced, producing images that appear to be higher quality even when the shading rate is reduced. Additionally, the shading rate may vary across an object and even within a primitive. The shading rate may also vary independent of the visibility rate. Finally, because the object-space shading grid is in object space, the shading grid does not necessarily change with each movement of the camera. Instead, the shading grid is updated when the object geometry changes.

Figure 8:
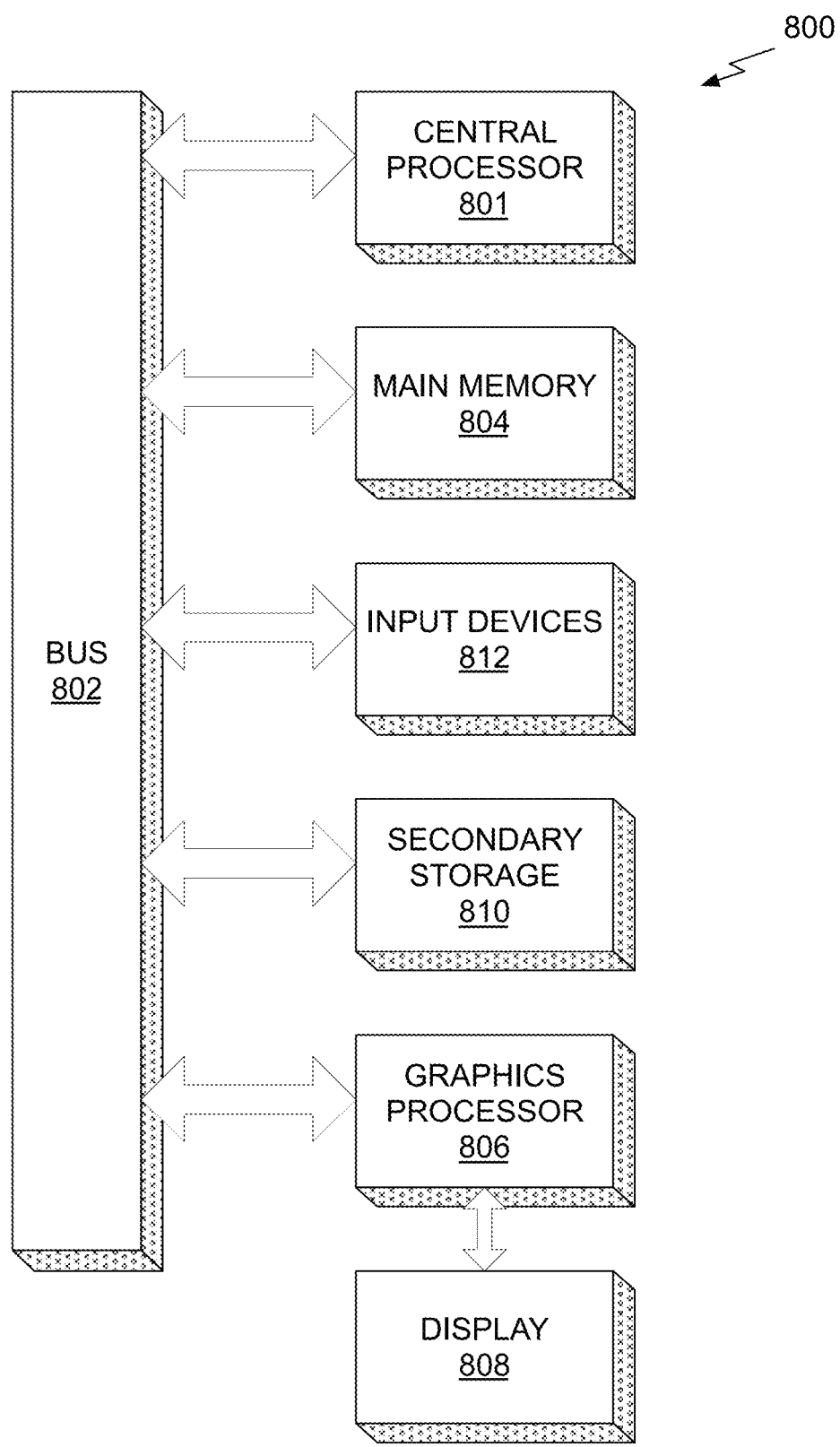
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method comprising:
receiving a primitive defined by vertices in three-dimensional (3D) space that is specific to an object defined by at least the primitive;
computing a shading sample rate for the primitive;
defining an object-space shading grid that is specific to the primitive,
wherein a shape of an object-space shading element corresponds to a shape of the primitive, wherein the object-space shading grid comprises at least one object-space shading element, and points on the object-space shading grid are identified based on the shading sample rate; and
executing, by a processing pipeline, a shader program to compute shaded attributes for the primitive by sampling the object-space shading grid.

2. The method of claim 1, wherein the primitive is defined by a first vertex, a second vertex, and a third vertex in the 3D space.

3. The method of claim 2, further comprising:
executing, by the processing pipeline, the shader program to compute a first shaded attribute associated with the first vertex;
executing, by the processing pipeline, the shader program to compute a second shaded attribute associated with the second vertex; and
executing, by the processing pipeline, the shader program to compute a third shaded attribute associated with the third vertex.

4. The method of claim 3, further comprising computing a shaded sample at a location within the primitive by interpolating the first, the second, and the third shaded attributes.

5. The method of claim 4, wherein the interpolating comprises barycentric interpolation.

6. The method of claim 4, further comprising:
subdividing the primitive into multiple sub-primitives including a first sub-primitive defined by the third vertex, a fourth vertex, and a fifth vertex;
executing, by the processing pipeline, the shader program to compute a fourth shaded attribute associated with the fourth vertex; and
executing, by the processing pipeline, the shader program to compute a fifth shaded attribute associated with the fifth vertex.

7. The method of claim 6, further comprising computing a second shaded sample at a location within the first sub-primitive by interpolating the third, the fourth, and the fifth shaded attributes.

8. The method of claim 7, further comprising computing a final shaded sample for the primitive by interpolating the shaded sample and the second shaded sample.

9. The method of claim 1, wherein the primitive is subdivided into sub-primitives that approximate a size of a pixel fragment transformed into the 3D space that is specific to the object.

10. The method of claim 9, wherein the primitive is subdivided based on the computed shading sample rate.

11. The method of claim 1, further comprising, prior to receiving the primitive, determining that the primitive is visible during early z-testing.

12. The method of claim 1, further comprising:
receiving a second primitive defined by at least one additional vertex in the 3D space that is specific to the object defined by at least the primitive and the second primitive; and
computing a second shading sample rate for the second primitive,
wherein the computed second shading sample rate is not equal to the computed shading sample rate for the primitive.

13. The method of claim 1, wherein the computed shading sample rate is also based on a specified shading rate corresponding to a number of samples specified for each screen-space pixel.

14. The method of claim 1, wherein sampling the object-space shading grid comprises:
computing finite differences for a sub-triangle within the primitive that is defined by points within the object-space grid; and
transforming the finite differences from 3D space to an orthonormal basis to compute object-space derivatives or screen-space derivatives.

15. The method of claim 1, wherein the coordinates at the vertices in 3D space that define the object-space shading grid are barycentric coordinates.

16. The method of claim 1, further comprising updating the object-space grid in response to a change in a shape of the primitive.

17. The method of claim 1, further comprising determining a camera position is changed and a shape of the primitive has not changed between a first frame and a second frame and reusing the object-space grid for the second frame.

18. The method of claim 1, wherein the shading sample rate computed for the primitive is a dynamic shading rate that varies within the primitive.

19. A system comprising:
a processing pipeline that is configured to:
receive a primitive defined by vertices in three-dimensional (3D) space that is specific to an object defined by at least the primitive;
compute a shading sample rate for the primitive;
define an object-space shading grid that is specific to the primitive,
wherein a shape of an object-space shading element corresponds to a shape of the primitive, wherein the object-space shading grid comprises at least one object-space shading element, and points on the object-space shading grid are identified based on the shading sample rate; and
execute a shader program to compute shaded attributes for the primitive by sampling the object-space shading grid.

20. A non-transitory computer-readable storage medium storing instructions that, when executed by a processor, causes the processor to perform steps comprising:
receiving a primitive defined by vertices in three-dimensional (3D) space that is specific to an object defined by at least the primitive;
computing a shading sample rate for the primitive;
defining an object-space shading grid that is specific to the primitive,
wherein a shape of an object-space shading element corresponds to a shape of the primitive, wherein the object-space shading grid comprises at least one object-space shading element, and points on the object-space shading grid are identified based on the shading sample rate; and
executing, by a processing pipeline, a shader program to compute shaded attributes for the primitive by sampling the object-space shading grid.

* * * * *